(12) United States Patent
Ye et al.

(10) Patent No.: US 9,647,355 B1
(45) Date of Patent: May 9, 2017

(54) AUTOMOBILE START SUPPLY VOLTAGE DETECTION ALLIGATOR CLIP WITH PULL-OFF FUNCTION

(71) Applicant: Dongguan Zhongkang Technology Electronics Co., LTD., Guangdong Province (CN)

(72) Inventors: Jianxin Ye, Guangdong Province (CN); Yuping Luo, Jiangxi Province (CN); Shihao Huang, Jiangxi Province (CN)

(73) Assignee: Dongguan Zhongkang Technology Electronics Co., Ltd., Guangdong Province (CN)

( * ) Notice: Subject to any disclaimer, the term of this patent is extended or adjusted under 35 U.S.C. 154(b) by 0 days.

(21) Appl. No.: 15/213,176

(22) Filed: Jul. 18, 2016

(30) Foreign Application Priority Data

Jun. 16, 2016 (CN) .......................... 2016 1 0426463

(51) Int. Cl.
*H01R 11/00* (2006.01)
*H01R 11/24* (2006.01)
*G01R 31/36* (2006.01)

(52) U.S. Cl.
CPC .......... *H01R 11/24* (2013.01); *G01R 31/3696* (2013.01)

(58) Field of Classification Search
CPC ...... H01R 11/04; H01R 11/281; H01R 11/288
USPC ........................................ 439/504, 503, 506
See application file for complete search history.

(56) References Cited

U.S. PATENT DOCUMENTS

| 4,163,134 A * | 7/1979 | Budrose ................ | H02J 7/0034 200/505 |
| 5,601,452 A * | 2/1997 | Ruffa ..................... | H01R 11/24 439/504 |
| 6,386,907 B1 * | 5/2002 | Ruffa ..................... | H01R 11/24 439/504 |

* cited by examiner

*Primary Examiner* — Phuong Dinh
(74) *Attorney, Agent, or Firm* — Schmeiser, Olsen & Watts, LLP

(57) ABSTRACT

The invention aims at providing an automobile start supply voltage detection alligator clip with a pull-off function, including: a positive alligator clip structure; a negative alligator clip structure; a male contact head; and a positive pull-off end and negative pull-off end arranged on the male contact head; the positive/negative alligator clip structure includes a positive/negative upper cover, positive/negative upper cover contact piece, positive/negative pull-off contact piece, positive/negative pull-off spring, positive/negative lower cover contact piece, positive/negative lower cover, and positive/negative upper and lower covers pressure spring; an internal positive/negative silica gel wire is sleeved in an external positive/negative silica gel wire by an internal silica gel wire sleeving process; and the positive/negative pull-off contact piece is connected to a positive/negative pull-off detection end by the internal positive/negative silica gel wire. The male contact head, positive pull-off detection end and negative pull-off detection end are wrapped together by encapsulation.

5 Claims, 5 Drawing Sheets

AUTOMOBILE START SUPPLY VOLTAGE DETECTION ALLIGATOR CLIP WITH PULL-OFF FUNCTION

FIELD OF THE INVENTION

The present invention relates to the technical field of alligator clips, and in particular, to an automobile start supply voltage detection alligator clip with an automatic disconnection function.

BACKGROUND OF THE INVENTION

With continuous development of the automotive technology, automobile power devices have become increasingly mature, but in order to ensure the security of the automobile start power supplies, connecting terminals need to be employed between connection ends, and all cables and wiring terminals are detected after equipment installation, cable wiring and crimped connection of the terminals to achieve an automatic pull-off function. However, in the prior art, if a clip accidentally hits the vehicle body, a short circuit will be produced to generate larger sparks, resulting in the damage of the vehicle body or the vehicle and bringing huge detection difficulties.

SUMMARY OF THE INVENTION

An object of the present invention is to provide an automobile start supply voltage detection alligator clip with a pull-off function, including:
   a positive alligator clip structure;
   a negative alligator clip structure;
   a male contact head; and
   a positive pull-off end and a negative pull-off end arranged on the male contact head;
   the positive alligator clip structure is composed of a positive upper cover, a contact piece of the positive upper cover, a positive pull-off contact piece, a positive pull-off spring, a contact piece of a positive lower cover, the positive lower cover and a pressure spring of the positive upper and lower covers, the contact piece of positive upper cover and the contact piece of the positive lower cover are connected by a positive contact piece silica gel electric wire, the contact piece of positive upper cover is fixed in the positive upper cover through a positive upper cover fixing screw, the contact piece of the positive lower cover is arranged on the positive lower cover, a positive insulating interlayer is arranged on the contact piece of the positive lower cover, the positive pull-off spring is arranged on the positive insulating interlayer, the positive pull-off contact piece is arranged on the positive pull-off spring, and the positive pull-off contact piece, the positive pull-off spring, the positive insulating interlayer and the contact piece of the positive lower cover are fixed in the positive lower cover by positive lower cover fixing screws successively;
   the negative alligator clip structure is composed of a negative upper cover, a contact piece of the negative upper cover, a negative pull-off contact piece, a negative pull-off spring, a contact piece of a negative lower cover, the negative lower cover and a pressure spring of the negative upper and lower covers, the contact piece of the negative upper cover and the contact piece of the negative lower cover are connected by a negative contact piece silica gel electric wire, the contact piece of the negative upper cover is fixed in the negative upper cover by a negative upper cover fixing screw, the contact piece of the negative lower cover is arranged on the negative lower cover, a negative insulating interlayer is arranged on the contact piece of the negative lower cover, the negative pull-off spring is arranged on the negative insulating interlayer, the negative pull-off contact piece is arranged on the negative pull-off spring, and the negative pull-off contact piece, the negative pull-off spring, the negative insulating interlayer and the contact piece of the negative lower cover are fixed in the negative lower cover by negative lower cover fixing screws successively; an internal positive silica gel wire is sleeved in an external positive silica gel wire by an internal silica gel wire sleeving process, and the positive pull-off contact piece is connected to a positive pull-off detection end by the internal positive silica gel wire; and
   an internal negative silica gel wire is sleeved in an external negative silica gel wire by the internal silica gel wire sleeving process, and the negative pull-off contact piece is connected to a negative pull-off detection end by the internal negative silica gel wire.

The male contact head, the positive pull-off detection end and the negative pull-off detection end are wrapped together by encapsulation.

A positive pressure spring is arranged between the positive upper cover and the positive lower cover.

A negative pressure spring is arranged between the negative upper cover and the negative lower cover.

An electric connector of a quick plug is respectively arranged in the positive pull-off detection end and the negative pull-off detection end, and the electric connector of the quick plug is connected with a removal clamp detection unit.

The present invention has the following advantages:
   1. The wire clip adds an automatic disconnection function of automobile battery voltage detection in the automobile start power supply.
   2. The main silica gel wire employs the process of sleeving the silica gel wire in the silica gel wire.
   3. After the automobile start power supply is correctly connected with the automobile battery, the clip will notify the host to open internal output to start the automobile. If any clip drops, the internal output will be closed automatically to ensure that the clip is electrically neutral in an idle state, so that the security and reliability of the start power supply are greatly improved.

DETAILED DESCRIPTION OF THE EMBODIMENTS

Figure 1:
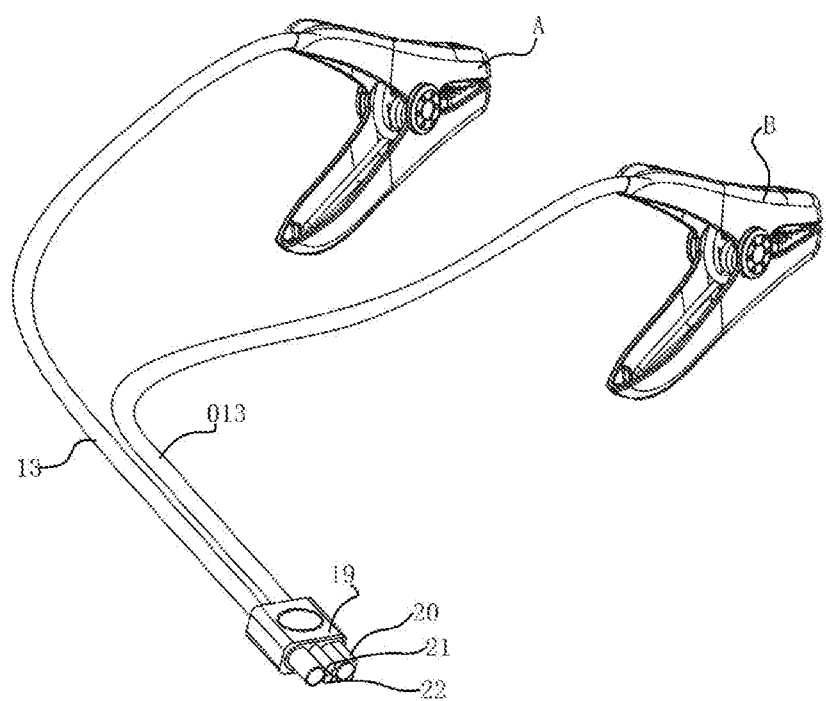
FIG. 1 is a schematic diagram of a structure of the present invention.
Figure 2:
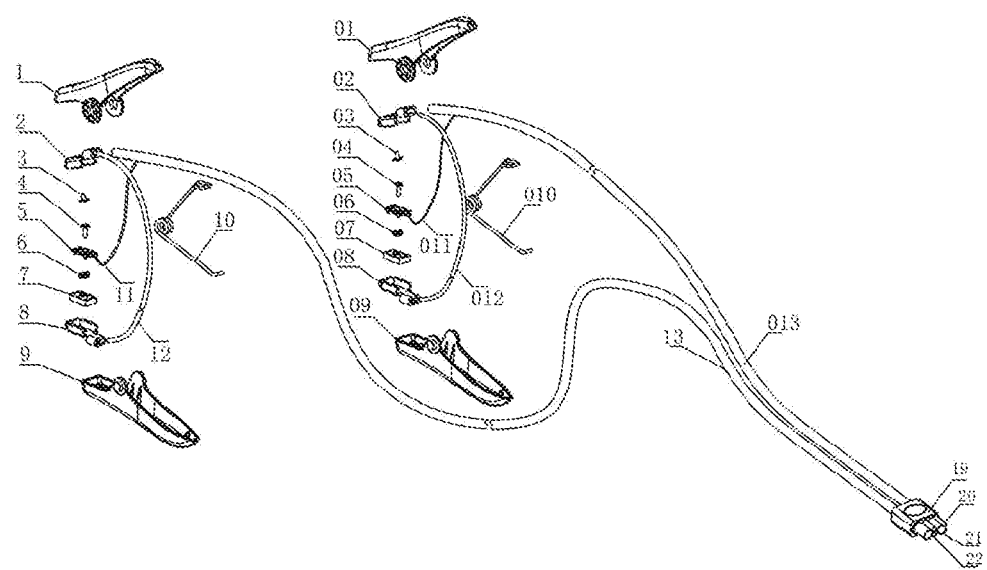
FIG. 2 is a schematic diagram of an exploded structure of the present invention.
Figure 3:
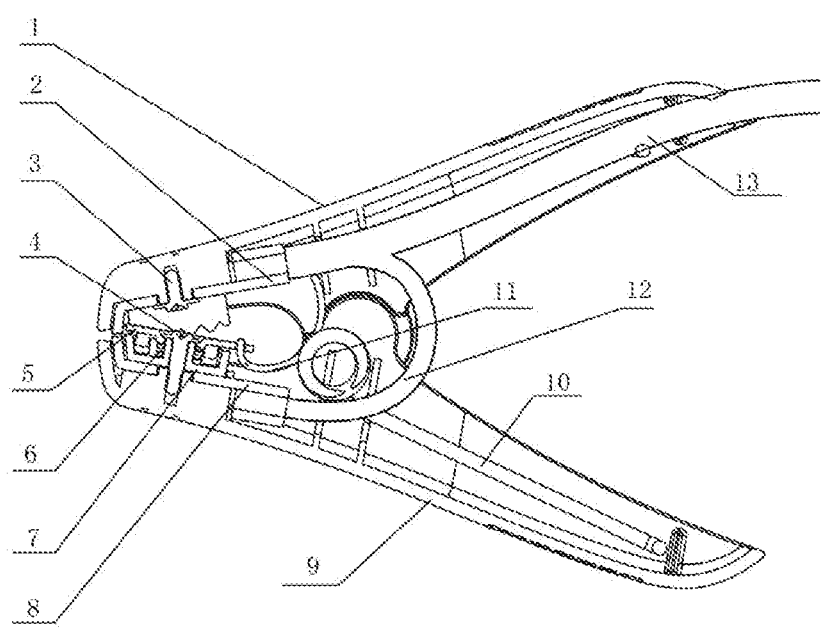
FIG. 3 is a schematic diagram of a structure of the present invention after a positive alligator clip structure is assembled.
Figure 4:
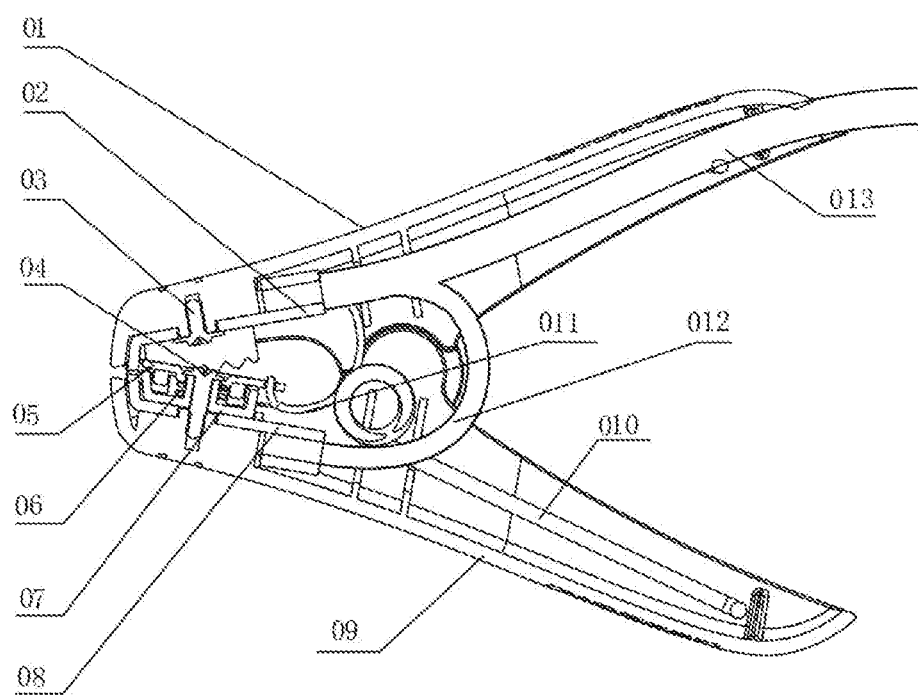
FIG. 4 is a schematic diagram of a structure of the present invention after a negative alligator clip structure is assembled.

The present invention will be illustrated below in detail in combination with the accompany drawings and specific embodiments, and the exemplary embodiments and illustration of the present invention herein are used for explaining the present invention, rather than limiting the present invention.

Referring to FIGS. 1 to 5, an object of the present invention is to provide an automobile start supply voltage detection alligator clip with a pull-off function, including:
a positive alligator clip structure A;
a negative alligator clip structure B;
a male contact head 20; and
a positive pull-off end 21 and a negative pull-off end 22 arranged on the male contact head 20;
the positive alligator clip structure A is composed of a positive upper cover 1, a contact piece 2 of the positive upper cover, a positive pull-off contact piece 5, a positive pull-off spring 6, a contact piece 8 of a positive lower cover, the positive lower cover 9 and a pressure spring 10 of the positive upper and lower covers, the contact piece 2 of positive upper cover and the contact piece 8 of the positive lower cover are connected by a positive contact piece silica gel electric wire 12, the contact piece 2 of positive upper cover is fixed in the positive upper cover 1 through a positive upper cover fixing screw 3, the contact piece 8 of the positive lower cover is arranged on the positive lower cover 9, a positive insulating interlayer 7 is arranged on the contact piece 8 of the positive lower cover, the positive pull-off spring 6 is arranged on the positive insulating interlayer 7, the positive pull-off contact piece 5 is arranged on the positive pull-off spring 6, and the positive pull-off contact piece 5, the positive pull-off spring 6, the positive insulating interlayer 7 and the contact piece 8 of the positive lower cover are fixed in the positive lower cover 9 by positive lower cover fixing screws 4 successively;

the positive alligator clip structure A is composed of a positive upper cover 01, a contact piece 02 of the positive upper cover, a positive pull-off contact piece 05, a positive pull-off spring 06, a contact piece 08 of a positive lower cover, the positive lower cover 09 and a pressure spring 010 of the positive upper and lower covers, the contact piece 02 of positive upper cover and the contact piece 08 of the positive lower cover are connected by a positive contact piece silica gel electric wire 012, the contact piece 02 of positive upper cover is fixed in the positive upper cover 01 through a positive upper cover fixing screw 03, the contact piece 08 of the positive lower cover is arranged on the positive lower cover 09, a positive insulating interlayer 07 is arranged on the contact piece 08 of the positive lower cover, the positive pull-off spring 06 is arranged on the positive insulating interlayer 07, the positive pull-off contact piece 05 is arranged on the positive pull-off spring 06, and the positive pull-off contact piece 05, the positive pull-off spring 06, the positive insulating interlayer 07 and the contact piece 08 of the positive lower cover are fixed in the positive lower cover 09 by positive lower cover fixing screws 04 successively;

an internal positive silica gel wire 11 is sleeved in an external positive silica gel wire 13 by an internal silica gel wire sleeving process, and the positive pull-off contact piece 5 is connected to a positive pull-off detection end 21 by the internal positive silica gel wire 11; and an internal negative silica gel wire 011 is sleeved in an external negative silica gel wire 013 by the internal silica gel wire sleeving process, and the negative pull-off contact piece 05 is connected to a negative pull-off detection end 22 by the internal negative silica gel wire 011.

The male contact head 20, the positive pull-off detection end 21 and the negative pull-off detection end 22 are wrapped together by encapsulation 19.

A positive pressure spring 10 is arranged between the positive upper cover 1 and the positive lower cover 9.

A negative pressure spring 010 is arranged between the negative upper cover 01 and the negative lower cover 09.

An electric connector of a quick plug is respectively arranged in the positive pull-off detection end 21 and the negative pull-off detection end 22, and the electric connector of the quick plug is connected with a removal clamp detection unit.

Taking the positive as an example:

When at work, whether the contact of the connecting wire of the positive and negative detection ends is good and whether a wrong positive and negative connection phenomenon occurs are checked at first, after preparation, the positive detection end is connected to the battery, the positive detection end respectively enters a 12V voltage input to the electric connector of the quick plug and is connected to the removal clamp detection unit through the electric connector of the quick plug, and positive signal modes are arranged at an output end of the battery and an input end of the electric connector of the quick plug. The positive pull-off contact piece 5 is in contact with the positive of the automobile battery to detect that a battery voltage signal is transmitted to the host, and is contact with the positive and negative electrodes of the battery or not to enable a host chip to judge whether there is a need to turn on or turn off the power supply. In order to prevent the wrong judgment of the host, the positive pull-off contact piece and the contact pieces of the positive upper and lower covers are mutually insulated by the positive insulating interlayer, a spring device is installed at the lower part of the positive pull-off contact piece, and when being connected with the automobile battery, the host can correctly output a working time through the contact pieces of the positive upper and lower covers.

Figure 5:
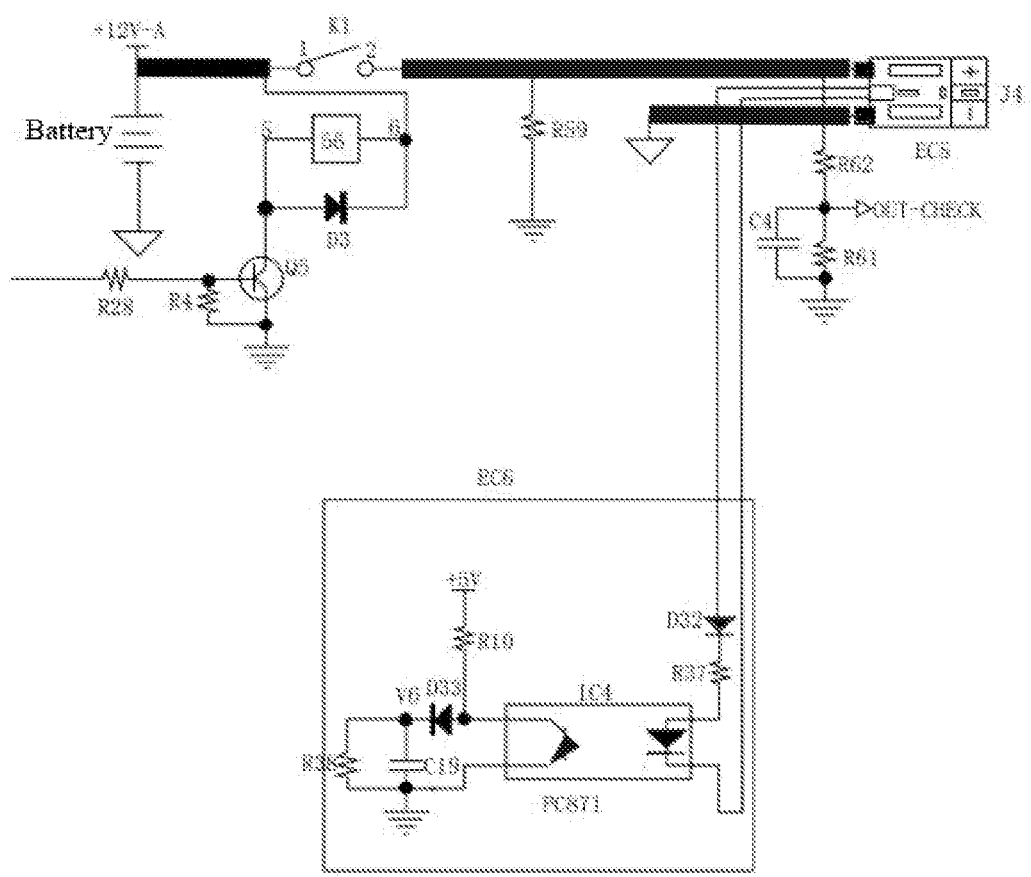
FIG. 5 is a schematic diagram of a circuit principle of the present invention.

The working circuit principle is shown in FIG. 5, in which EC5 is a circuit diagram of the electric connector of the quick plug, and EC6 is a circuit diagram of the removal clamp detection unit.

The technical solutions provided by the embodiments of the present invention have been described above in detail, specific examples are used herein to illustrate the principle and the implementation mode of the embodiments of the present invention, and the illustration of the above embodiments is merely adapted to facilitate understanding the principles of the embodiments of the present invention; and meanwhile, those of ordinary skill in the art can make modifications to the specific implementation mode and the application range according to the embodiments of the present invention, and in summary, the contents in the description should not be construed as limitations to the present invention.

The invention claimed is:

1. An automobile start supply voltage detection alligator clip with a pull-off function, comprising:
a positive alligator clip structure;
a negative alligator clip structure;
a male contact head; and
a positive pull-off end and a negative pull-off end arranged on the male contact head;
wherein the positive alligator clip structure is composed of a positive upper cover, a contact piece of the positive upper cover, a positive pull-off contact piece, a positive pull-off spring, a contact piece of a positive lower cover, the positive lower cover and a pressure spring of the positive upper and lower covers, the contact piece of positive upper cover and the contact piece of the positive lower cover are connected by a positive contact piece silica gel electric wire, the contact piece of positive upper cover is fixed in the positive upper cover through a positive upper cover fixing screw, the contact piece of the positive lower cover is arranged on the positive lower cover, a positive insulating interlayer is arranged on the contact piece of the positive lower cover, the positive pull-off spring is arranged on the positive insulating interlayer, the positive pull-off contact piece is arranged on the positive pull-off spring, and the positive pull-off contact piece, the positive pull-off spring, the positive insulating interlayer and the contact piece of the positive lower cover are fixed in the positive lower cover by positive lower cover fixing screws successively;

the negative alligator clip structure is composed of a negative upper cover, a contact piece of the negative upper cover, a negative pull-off contact piece, a negative pull-off spring, a contact piece of a negative lower cover, the negative lower cover and a pressure spring of the negative upper and lower covers, the contact piece of the negative upper cover and the contact piece of the negative lower cover are connected by a negative contact piece silica gel electric wire, the contact piece of the negative upper cover is fixed in the negative upper cover by a negative upper cover fixing screw, the contact piece of the negative lower cover is arranged on the negative lower cover, a negative insulating interlayer is arranged on the contact piece of the negative lower cover, the negative pull-off spring is arranged on the negative insulating interlayer, the negative pull-off contact piece is arranged on the negative pull-off spring, and the negative pull-off contact piece, the negative pull-off spring, the negative insulating interlayer and the contact piece of the negative lower cover are fixed in the negative lower cover by negative lower cover fixing screws successively;

an internal positive silica gel wire is sleeved in an external positive silica gel wire by an internal silica gel wire sleeving process, and the positive pull-off contact piece is connected to a positive pull-off detection end by the internal positive silica gel wire; and an internal negative silica gel wire is sleeved in an external negative silica gel wire by the internal silica gel wire sleeving process, and the negative pull-off contact piece is connected to a negative pull-off detection end by the internal negative silica gel wire.

2. The automobile start supply voltage detection alligator clip with the pull-off function of claim 1, wherein the male contact head, the positive pull-off detection end and the negative pull-off detection end are wrapped together by encapsulation.

3. The automobile start supply voltage detection alligator clip with the pull-off function of claim 1, wherein a positive pressure spring is arranged between the positive upper cover and the positive lower cover.

4. The automobile start supply voltage detection alligator clip with the pull-off function of claim 1, wherein a negative pressure spring is arranged between the negative upper cover and the negative lower cover.

5. The automobile start supply voltage detection alligator clip with the pull-off function of claim 1, wherein an electric connector of a quick plug is respectively arranged in the positive pull-off detection end and the negative pull-off detection end, and the electric connector of the quick plug is connected with a removal clamp detection unit.

* * * * *